(12) United States Patent
Okutsu

(10) Patent No.: US 10,042,398 B2
(45) Date of Patent: Aug. 7, 2018

(54) ELECTRONIC APPARATUS

(71) Applicant: Kabushiki Kaisha Toshiba, Tokyo (JP)

(72) Inventor: Isao Okutsu, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 120 days.

(21) Appl. No.: 14/160,241

(22) Filed: Jan. 21, 2014

(65) Prior Publication Data

US 2014/0321068 A1    Oct. 30, 2014

(30) Foreign Application Priority Data

Apr. 26, 2013   (JP) .................................. 2013-094508

(51) Int. Cl.
*G06F 1/16* (2006.01)
*G06F 1/18* (2006.01)
*H04N 5/64* (2006.01)

(52) U.S. Cl.
CPC ............ *G06F 1/187* (2013.01); *G06F 1/1658* (2013.01); *H04N 5/64* (2013.01)

(58) Field of Classification Search
CPC ....... G06F 1/187; G06F 1/1658; G06F 1/1656
USPC .......................................... 361/679.3–679.4
See application file for complete search history.

(56) References Cited

U.S. PATENT DOCUMENTS

| | | | |
|---|---|---|---|
| 6,196,516 B1 * | 3/2001 | Lan | G06F 1/184 248/615 |
| 6,751,092 B1 | 6/2004 | Ohnishi et al. | |
| 7,423,868 B2 * | 9/2008 | Mihara | G06F 1/1616 248/634 |
| 8,040,670 B2 * | 10/2011 | Tatsukami | G06F 1/1616 211/26 |
| 8,432,681 B2 * | 4/2013 | Tung-Ke | G11B 33/124 361/679.33 |
| 8,584,999 B2 * | 11/2013 | Liu | G06F 1/187 248/222.12 |
| 2002/0044416 A1 * | 4/2002 | Harmon, III | G11B 33/08 361/679.36 |
| 2003/0169565 A1 * | 9/2003 | Wang | G06F 1/184 361/679.33 |
| 2007/0014087 A1 * | 1/2007 | Kwak | G06F 1/187 361/679.33 |
| 2009/0040705 A1 | 2/2009 | Tatsukami | |
| 2011/0157850 A1 | 6/2011 | Kitamura et al. | |
| 2011/0273827 A1 | 11/2011 | Kasai et al. | |

FOREIGN PATENT DOCUMENTS

| | | |
|---|---|---|
| JP | 07-105671 | 4/1995 |
| JP | H11-242881 A | 9/1999 |
| JP | 2001-502103 A | 2/2001 |
| JP | 2002-367361 A | 12/2002 |
| JP | 2006-127651 A | 5/2006 |
| JP | 2009-043355 | 2/2009 |
| JP | 2011-138629 A | 7/2011 |
| JP | 2012-014749 | 1/2012 |
| WO | 99/06902 A1 | 2/1999 |
| WO | 2010/087143 A1 | 8/2010 |

* cited by examiner

*Primary Examiner* — Nidhi Thaker
(74) *Attorney, Agent, or Firm* — Rutan & Tucker, LLP

(57) ABSTRACT

According to one embodiment, an electronic apparatus includes a first case, module accommodated in the first case, a first cushion between the first case and the module, and a holding member to hold the module with respect to the first case movably.

2 Claims, 17 Drawing Sheets

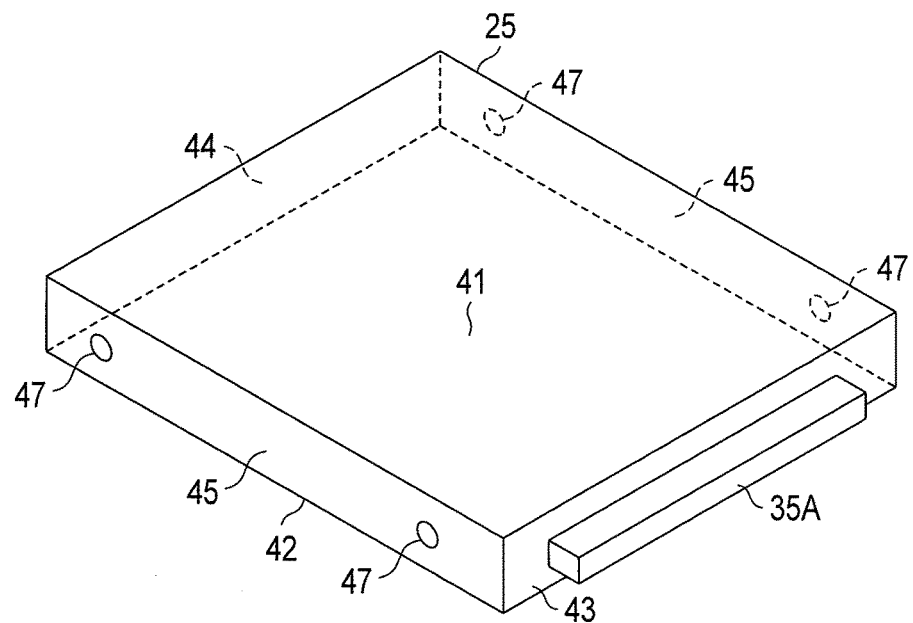
F I G. 4
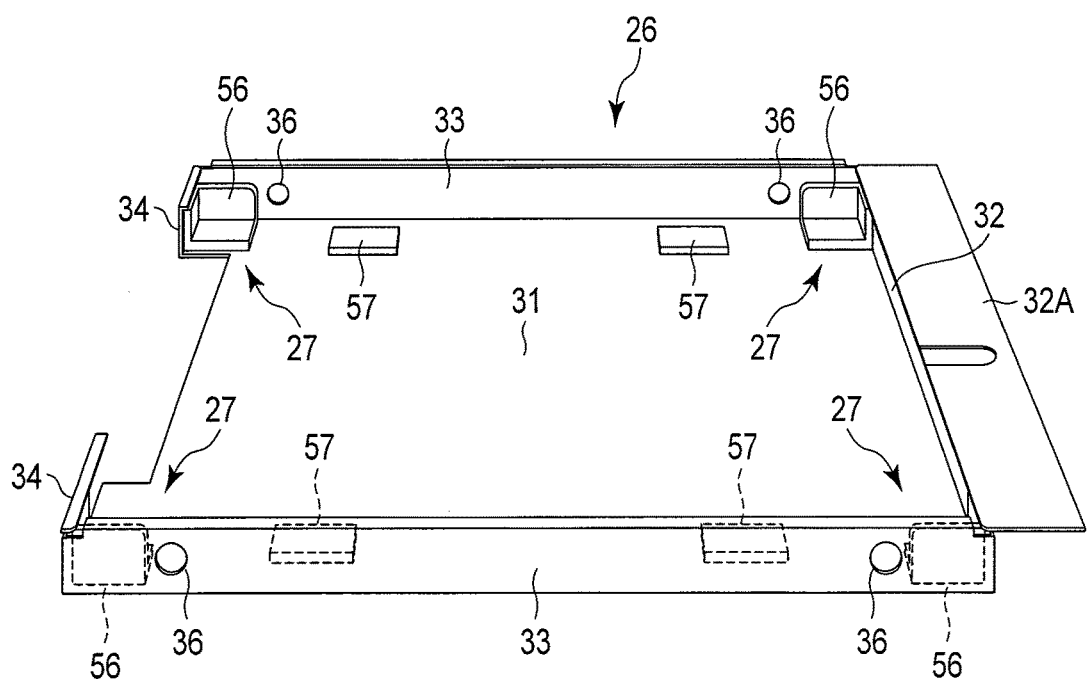
F I G. 5

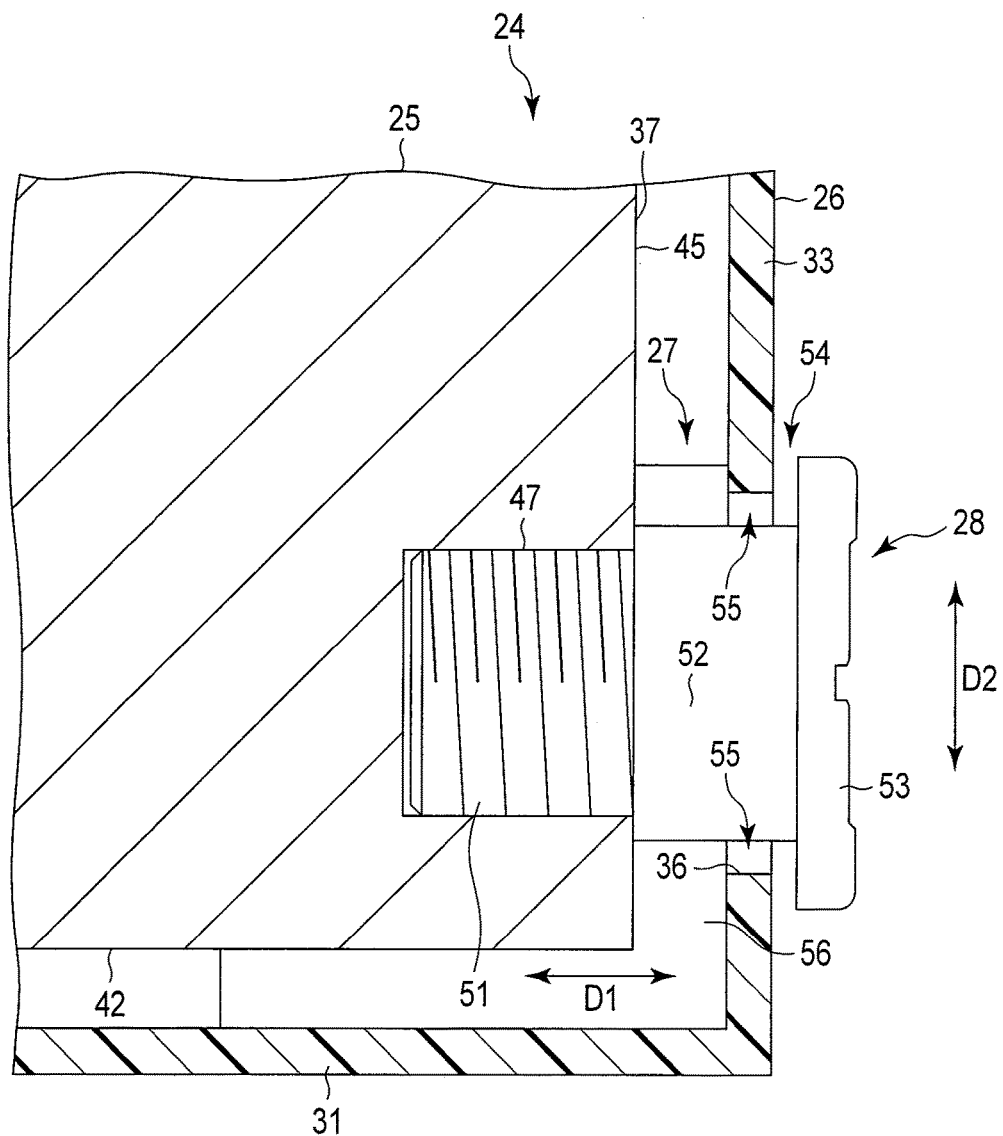
F I G. 6

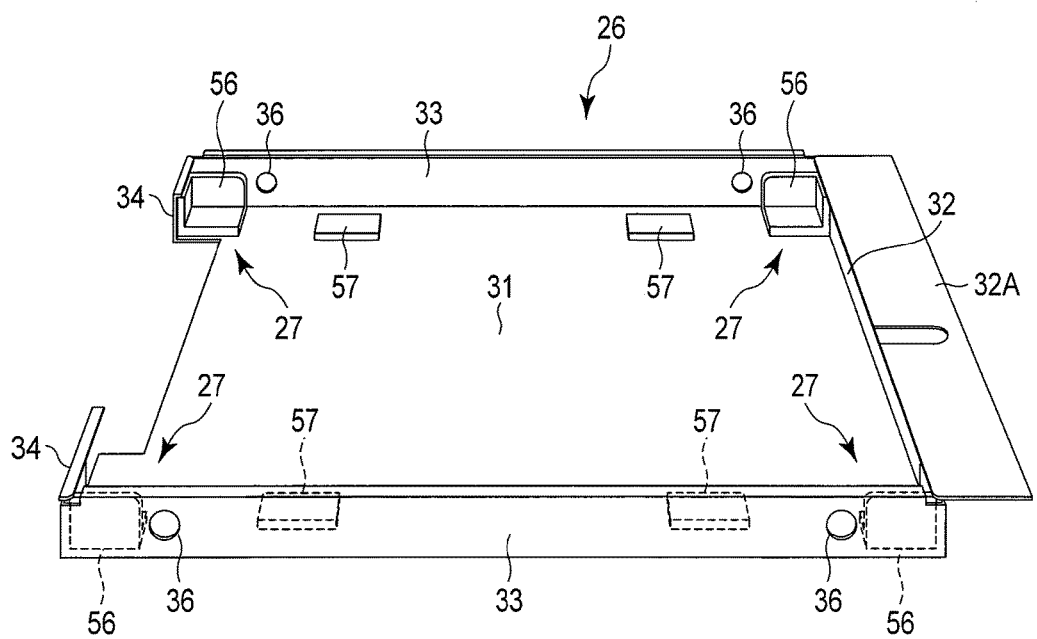
F I G. 10

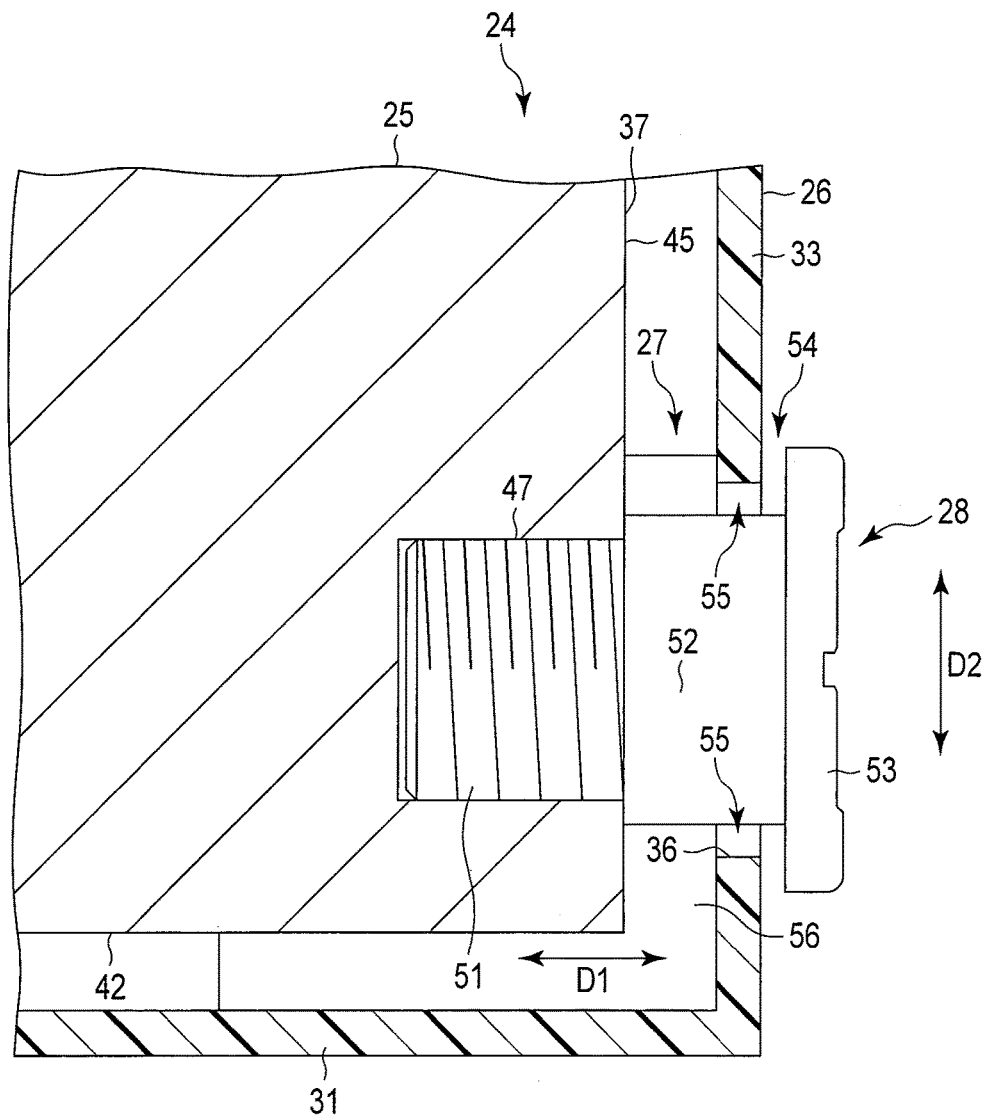
F I G. 11

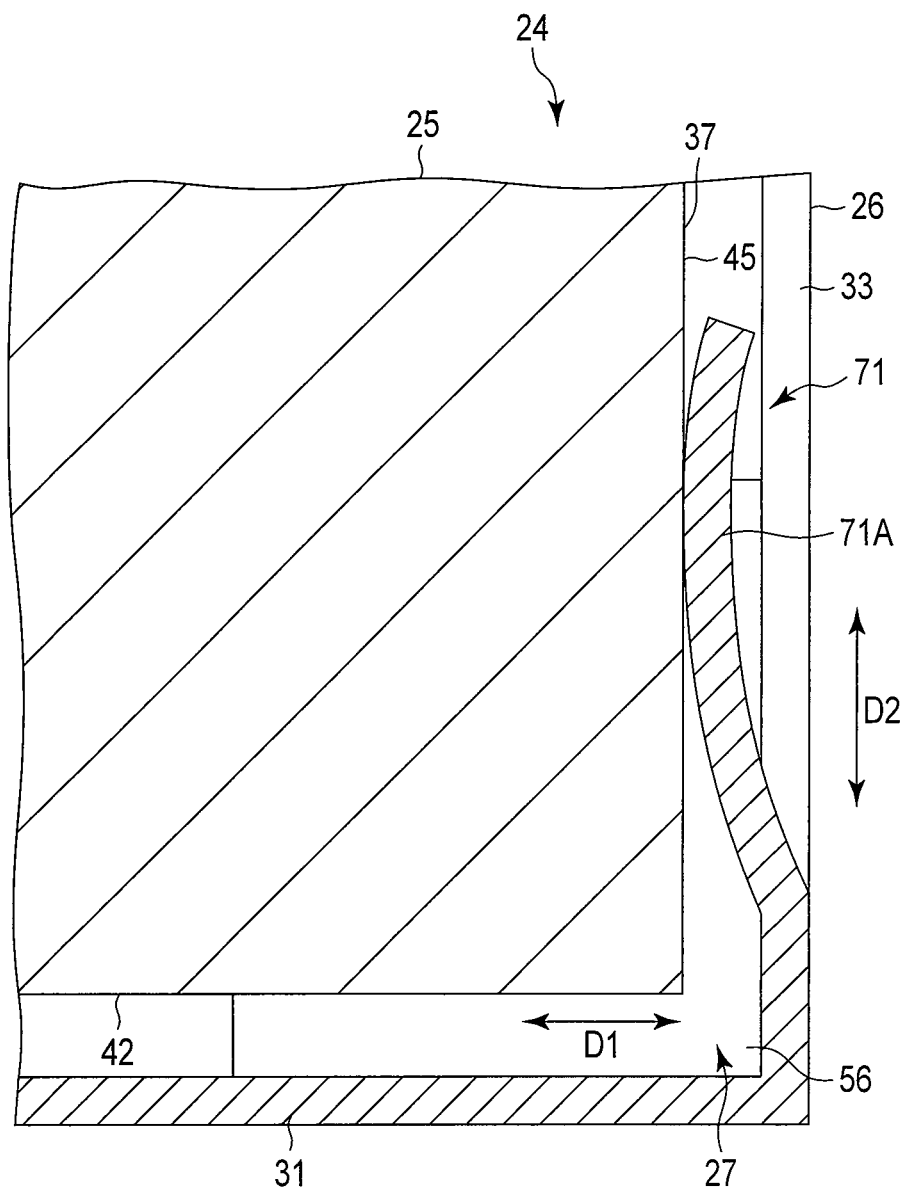
F I G. 14

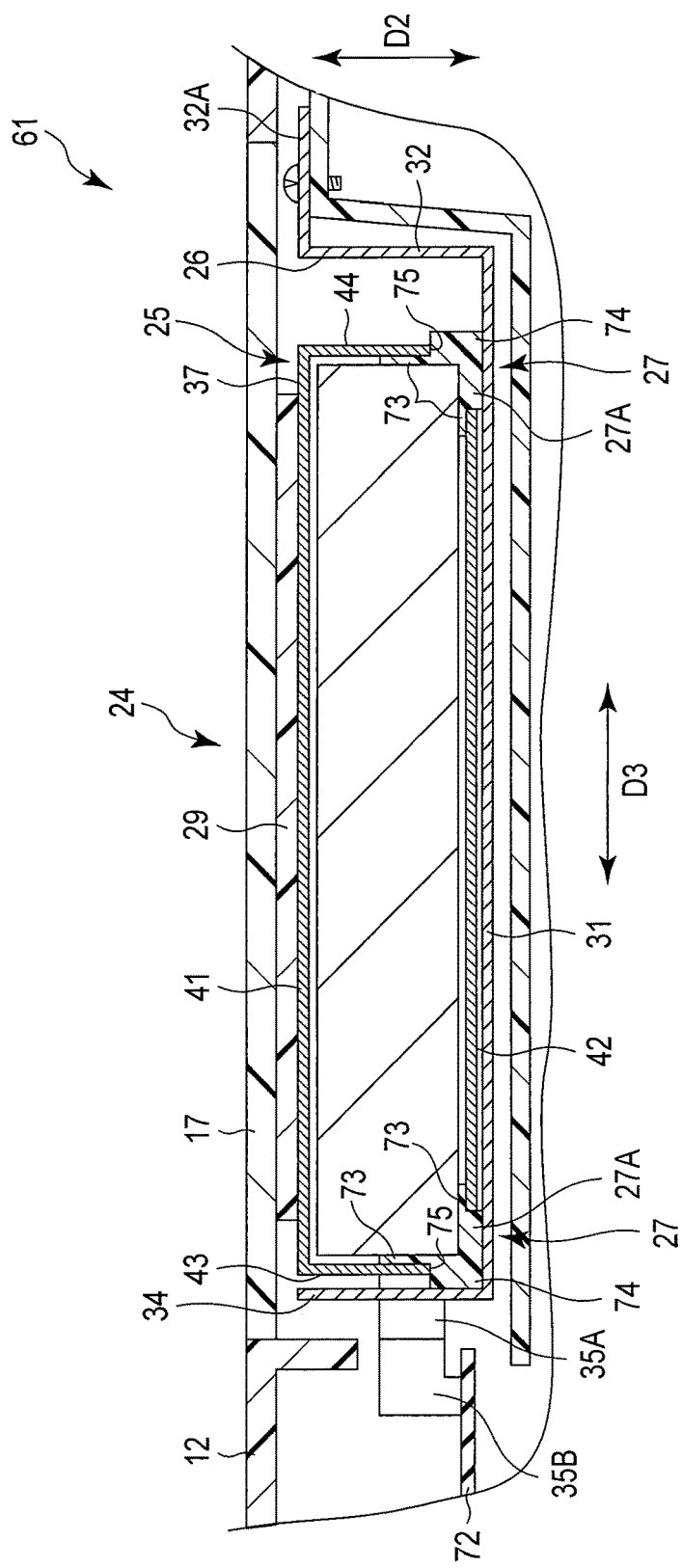
F I G. 16

ELECTRONIC APPARATUS

CROSS-REFERENCE TO RELATED APPLICATIONS

This application is based upon and claims the benefit of priority from Japanese Patent Application No. 2013-094508, filed Apr. 26, 2013, the entire contents of which are incorporated herein by reference.

FIELD

Embodiments described herein relate generally to an electronic apparatus which are including a module.

BACKGROUND

In recent years, there are needs for highly reliable electronic apparatuses having high resistance to impact on the market of electronic apparatuses. An electronic apparatus contains a plurality of modules used for various purposes. Protecting these modules from vibration and impact leads to the improvement of reliability of electronic apparatuses. Thus, softening vibration and impact on modules contributes to the improvement of reliability of electronic apparatuses.

BRIEF DESCRIPTION OF THE DRAWINGS

FIG. 4 is a perspective view showing modules in the module assembly in FIG. 3;

FIG. 5 is a perspective view showing a first case of the module assembly in FIG. 3;

FIG. 6 is a sectional view of the module assembly along an F6-F6 line in FIG. 3;

FIG. 10 is a perspective view showing a first case of the module assembly in FIG. 7;

FIG. 11 is a sectional view of the module assembly along an F11-F11 line in FIG. 9;

FIG. 14 shows a sectional view of a third modification of the electronic apparatus according to the second embodiment;

FIG. 16 is a sectional view of the module assembly in FIG. 15 cut along a D2 direction and the D3 direction;

DETAILED DESCRIPTION

In general, an electronic apparatus according to an embodiment includes a first case, a module, a first cushion, and a holding member. The module is accommodated in the first case. The first cushion is provided between the first case and the module. The holding member holds the module with respect to the first case movably in inside the first case. The electronic apparatus thereby improves the reliability.

First Embodiment

Figure 1:
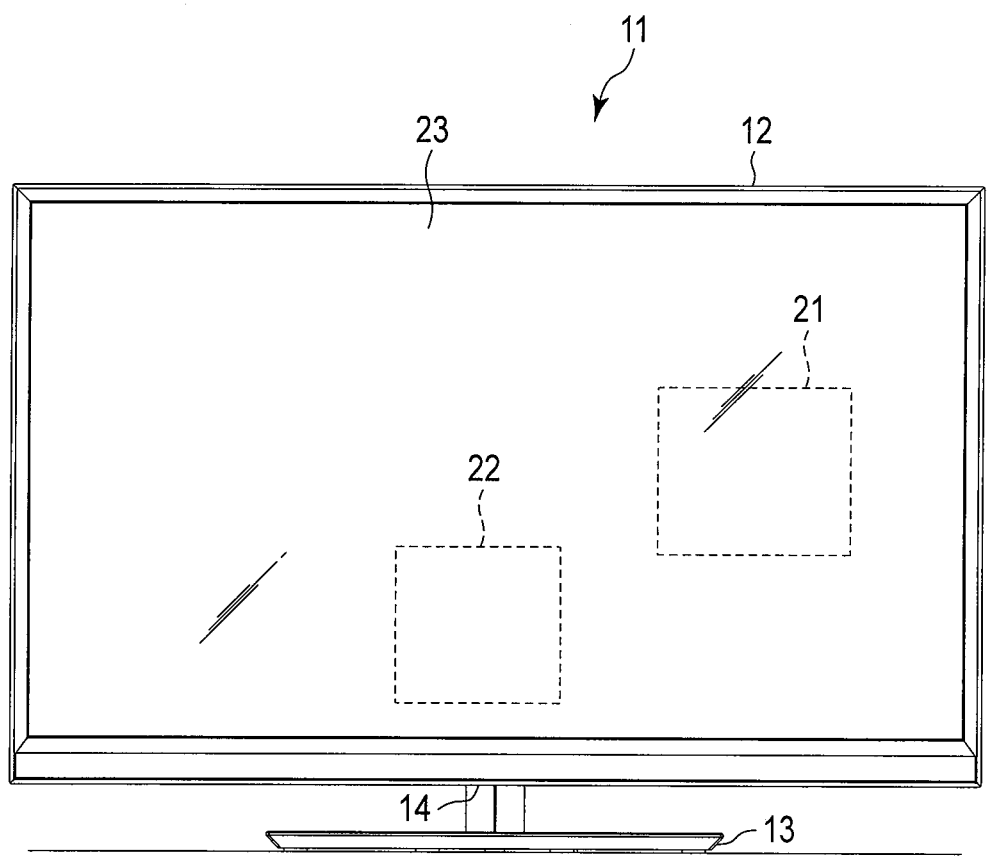
FIG. 1 shows a front view of a display apparatus as an example an electronic apparatus according to a first embodiment.

A first embodiment of an electronic apparatus will be described with reference to FIGS. 1 to 6. As shown in FIG. 1, a television 11 as an example of the electronic apparatus is a display apparatus (including an electronic apparatus, a television, a receiver, a broadcasting wave receiving apparatus, a receiving apparatus, an image display apparatus and the like) having an outer shape of a rectangular parallelepiped (including a rectangular, flat box).

Figure 2:
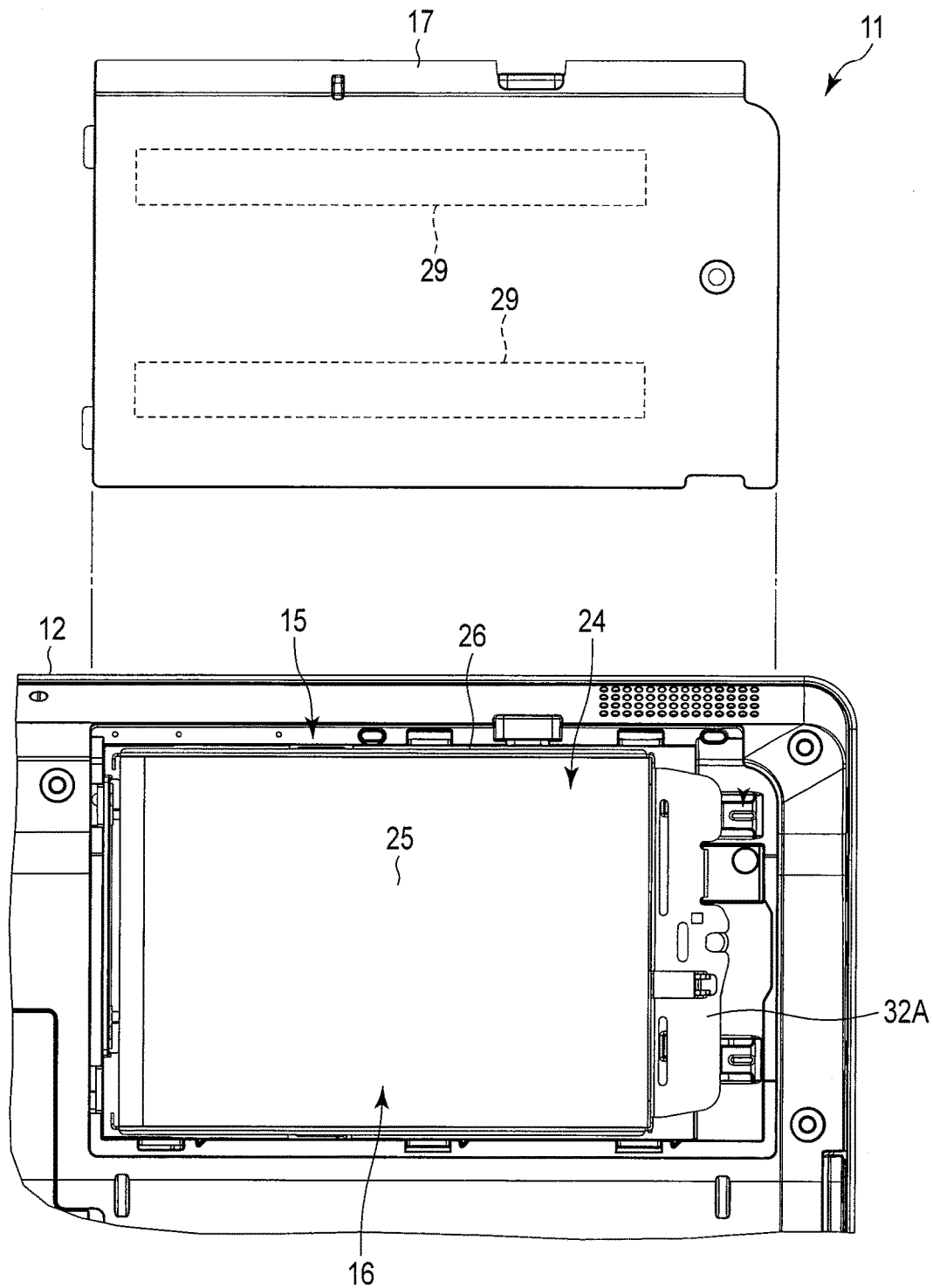
FIG. 2 is a rear view showing a module assembly after a cover of the display apparatus in FIG. 1 is removed from an enclosure.

As shown in FIG. 1, the television 11 includes an enclosure 12 formed from, for example, a synthetic resin material and a leg portion 13 supporting the enclosure 12. The leg portion 13 includes a swivel portion 14 to turn the enclosure 12 in the horizontal direction. As shown in FIG. 2, the enclosure 12 has an opening 15, a compartment 16 provided on an inner side from the opening 15, a cover 17 to cover the opening 15, in a position corresponding to a module 25 described later.

As shown in FIGS. 1 and 2, the television 11 includes a system board 21 (also called a printed circuit board or circuit board) that centrally controls each unit, a power circuit board 22 (also called a power supply module, power unit, or power controller), a flat display panel 23 including a face on which an image is displayed as a display screen, and a module assembly 24 accommodated in the compartment 16 inside the enclosure 12. The system board 21 includes, for example, a tuner.

The display panel 23 is configured by a liquid crystal display panel. The other kinds of display panel like, for example, a plasma display panel, an organic EL, a plastic display panel, and a sheet display panel may also be available for the display panel.

Figure 3:
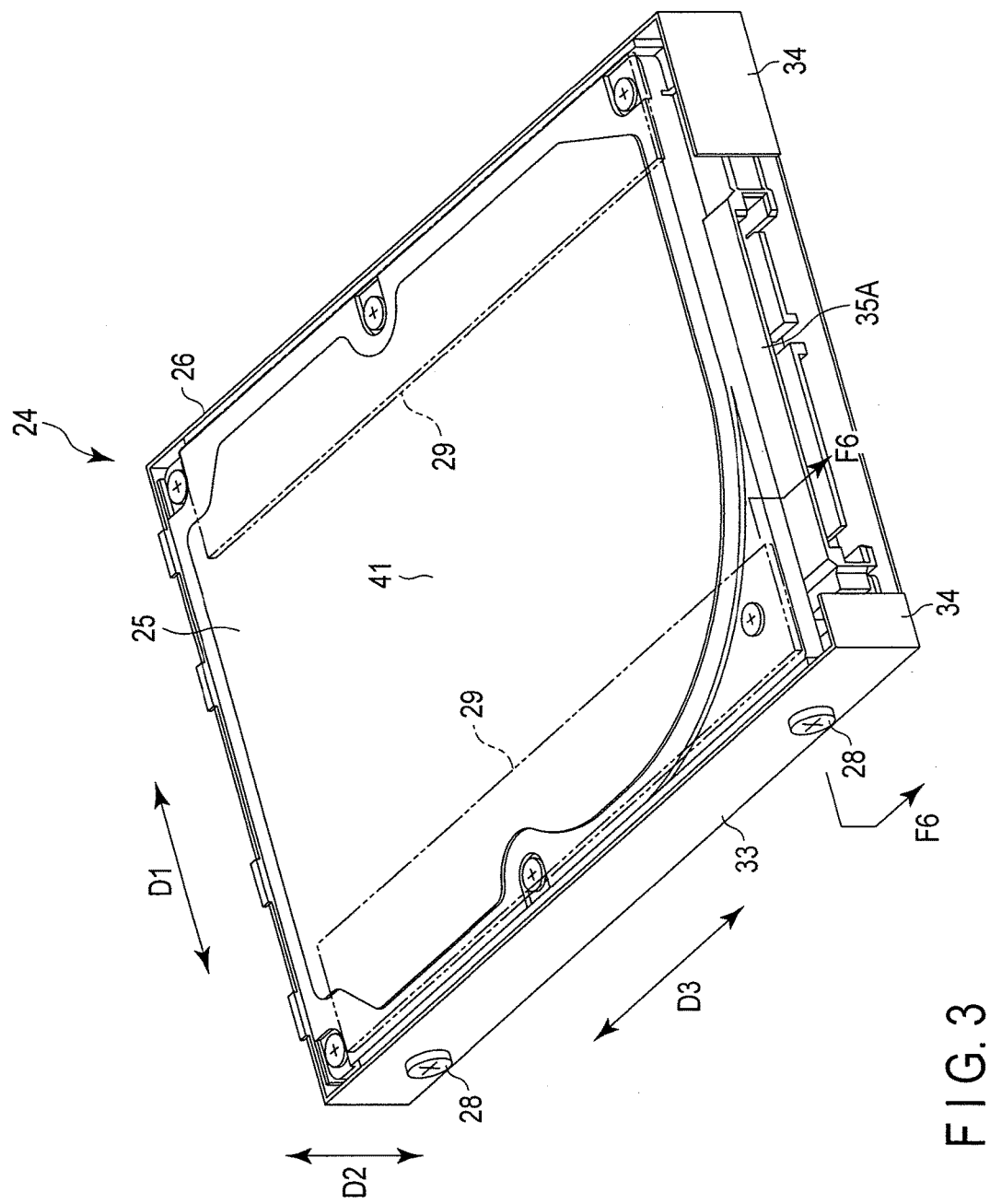
FIG. 3 is a perspective view schematically showing the module assembly in FIG. 2.

As shown in FIGS. 3 to 5, the module assembly 24 has the module 25 in a box shape, a first case 26 surrounding the outer side of the module 25, a first cushion 27 provided between the module 25 and the first case 26, a fastening member 28 that holds the module 25 with respect to the first case 26, and a second cushion 29 secured on the inner surface of the cover 17.

As shown in FIG. 5, the first case 26 is formed from a metallic material in a box shape having an opening on one side. The first case 26 includes a first wall portion 31 forming a bottom wall, a second wall portion 32 forming a side wall rising from the first wall portion 31 and having a attaching portion 32A to the enclosure 12, a pair of third wall portions 33 forming a side wall rising from the first wall portion 31 and through which the fastening member 28 (or a holding member) passes and a fourth wall portion 34 forming a side wall rising from the first wall portion 31 and positioned near a connector 35A. The third wall portion 33 has a plurality (four in the present embodiment) of holes 36 to allow the fastening member 28 to pass through. In FIG. 3, the attaching portion 32A is omitted.

In the present embodiment, the module 25 is configured by a hard disk drive (HDD), but is not limited to the above example. The module 25 may be, for example, an optical disk device (ODD), a flash memory, a module mounted with a graphic chip, a wireless LAN module, or other components like a battery.

As shown in FIG. 4, the module 25 includes a second case 37 forming an outer shell thereof. The second case 37 is a so-called shield case and prevents an electromagnetic wave from leaking from the module 25 to the outside or conversely an outside electromagnetic wave from adversely affecting the inside of the module 25.

The second case 37 has a first face 41 positioned near the enclosure 12 (cover 17), a second face 42 opposed to the first face 41, a third face 43 having the connector 35A connected to the system board 21 via a flexible cable or the like, a fourth face 44 facing the third face 43, and a pair of fifth faces 45 provided with a plurality (four in the present embodiment) of anchor holes 47 to which the fastening member 28 (or a holding member) is secured.

As shown in FIGS. 3 and 6, the fastening member 28 is an example of the holding member movably holding the module 25 with respect to the first case 26 and is configured by a so-called shouldered screw in the present embodiment. The fastening member 28 includes an engaging portion 51 in which an external thread is formed so as to be engaged with the module 25, a shaft 52 extending from the engaging portion 51 and inserted into the hole 36 of the first case 26, and a head portion 53 continuously formed with the shaft 52. The shaft 52 is formed in a cylindrical shape and the outer circumferential surface thereof is formed smoothly without any external thread being formed. The head portion 53 is an example of a blocking portion and blocks the shaft 52 from dropping from the hole 36 of the first case 26. In the present embodiment, a first gap 54 of a predetermined dimension (for example, 0.5 mm to a few mm) is formed between the head portion 53 and the first case 26. In addition, a second gap 55 of a predetermined dimension (for example, 0.5 mm to a few mm) is formed between the shaft 52 of the fastening member 28 and the hole 36 of the first case 26.

As shown in FIGS. 5 and 6, the first cushion 27 has a plurality (four in the present embodiment) of first portion 56 attached to the first case 26 so as to correspond to corners of the module 25 and a plurality (four in the present embodiment) of second portions 57 attached to the first wall portion 31 of the first case 26. The first portion 56 is formed like covering a corner on the side of the second face 42 of the module 25 and abuts on three faces of the module 25. For example, in the upper left in FIG. 5, the first portion 56 provided in a position extending over the first wall portion 31, the third wall portion 33, and the fourth wall portion 34 abuts on the second face 42, the third face 43, and the fifth face 45 of the module 25. Similarly, in the upper right in FIG. 5, the first portion 56 provided in a position extending over the first wall portion 31, the second wall portion 32, and the third wall portion 33 abuts on the second face 42, the fourth face 44, and the fifth face 45 of the module 25.

The second portion 57 is formed in a sheet shape having a predetermined thickness and abuts on the second face 42 of the module 25. Both of the first portion 56 and the second portion 57 of the first cushion 27 are integrally formed from an elastic body such as synthetic rubber, but may also be formed from other materials such as a sponge.

As shown in FIGS. 2 and 3, the second cushion 29 is formed in a sheet shape having a predetermined thickness and abuts on the first face 41 of the module 25. The second cushion 29 is integrally formed from an elastic body such as synthetic rubber, but may also be formed from other materials such as a sponge. The second cushion 29 may be pasted to the first face 41 of the module 25.

Subsequently, an impact absorption function for the module 25 of the television 11 in the first embodiment will be described with reference to FIGS. 3 and 6. When an impact is applied to the television 11 in the D1 direction in FIGS. 3 and 6, the first gap 54 is provided between the head portion 53 of the fastening member 28 and the first case 26 (here, the third wall portion 33) and thus, even though it is an infinitesimal distance, the module 25 can move inside the first case 26 in an opposite direction of the impact along the D1 direction. When the module 25 moves as described above, a difference of relative kinetic energy between the module 25 and the first case 26 is absorbed by the first portion 56 of the first cushion 27 positioned in the moving direction. Accordingly, an impact or vibration propagated to the first case 26 is prevented from being directly transmitted to the module 25.

Similarly, the second gap 55 is provided between the shaft 52 of the fastening member 28 and the hole 36 of the first case 26 and thus, even though it is an infinitesimal distance, the module 25 can move inside the first case 26 in an opposite direction of the impact along the D2 direction or the D3 direction when an impact is applied to the television 11 in the D2 direction or the D3 direction in FIGS. 3 and 6. When the module 25 moves in the D2 direction, kinetic energy of the module 25 is absorbed by the first portion 56 and the second portion 57 of the first cushion 27 or the second cushion 29 positioned in the moving direction. When the module 25 moves in the D3 direction, a difference of relative kinetic energy between the module 25 and the first case 26 is absorbed by the first portion 56 of the first cushion 27 positioned in the moving direction. Accordingly, an impact or vibration propagated to the first case 26 is prevented from being directly transmitted to the module 25.

According to the first embodiment, a display apparatus includes the module 25, the first case 26 surrounded of the module 25, the first cushion 27 provided between the module 25 and the first case 26, and a holding member (or the fastening member 28) that holds the module 25 in the first case 26 and permits movement of the module 25 inside the first case 26.

According to the above configuration, the holding member holds the module 25 such that movement of the module 25 inside the first case 26 is permitted, that is, in a floating state. Therefore, even if an impact is applied to the display apparatus, the impact can be prevented from being directly propagated to the module 25.

Second Embodiment

An embodiment (second embodiment) of an electronic apparatus will be described with reference to FIGS. 7 to 11. In the present embodiment, a case will be described when it is applied to a portable computer 61 as an example of the electronic apparatus. The appearance of the portable computer 61 is different from that of the display apparatus in the first embodiment, but a portion of an internal structure is common to that in the first embodiment. Thus, mainly different portions will be described and common reference numerals or symbols are attached to common portions and the description thereof is omitted.

Figure 7:
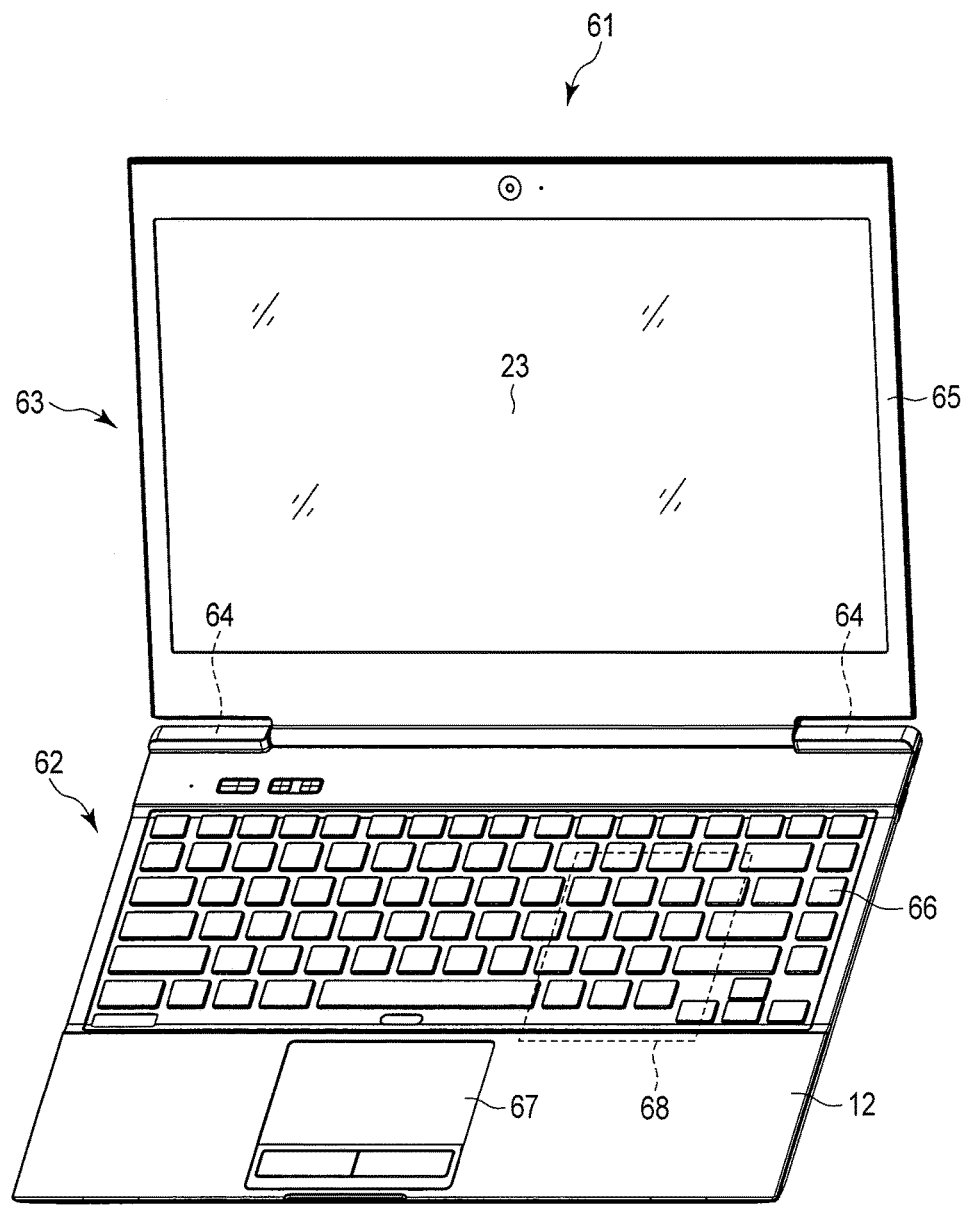
FIG. 7 shows a perspective view of a portable computer as an example of the electronic apparatus according to a second embodiment.

As shown in FIG. 7, a portable computer 61 as an example of the electronic apparatus includes a body unit 62, a display unit 63, and a hinge portion 64 provided between the body unit 62 and the display unit 63. The hinge portion 64 rotatably supports the display unit 63.

The display unit 63 has a display panel 23 and a display case 65 surrounding the display panel 23. The display case 65 is formed from, for example, a synthetic resin material. The display panel 23 is configured by a liquid crystal display panel in the present embodiment, other kinds of display panel like, for example, a plasma display panel, an organic EL, a plastic display panel, and a sheet display panel may also be available for the display panel.

Figure 8:
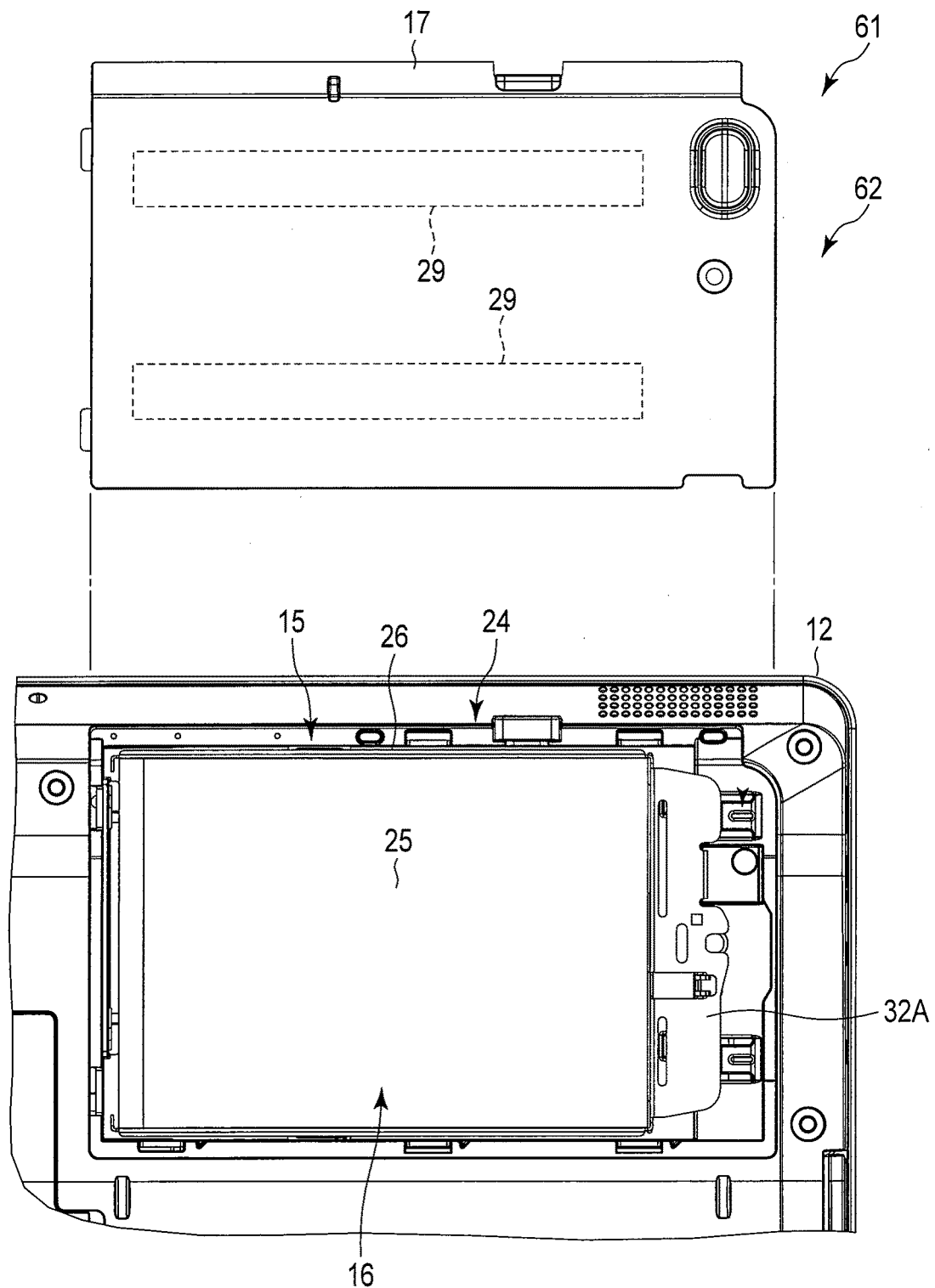
FIG. 8 is a bottom view showing the module assembly when the cover of the portable computer in FIG. 7 is removed from the enclosure.

As shown in FIGS. 7 and 8, the body unit 62 includes a enclosure 12 formed from, for example, a synthetic resin material in a box shape, an opening 15 provided in the enclosure 12, a compartment 16 provided on an inner side from the opening 15, a module assembly 24 accommodated in the compartment 16, a cover 17 to cover the opening 15, a keyboard 66 provided on a top face (or a top wall) of the enclosure 12, a touch pad 67 provided on the top face of the enclosure 12, and a printed circuit board 68 accommodated inside the enclosure 12.

A CPU (not shown) is provided on the printed circuit board 68 (also called a motherboard or main board).

Figure 9:
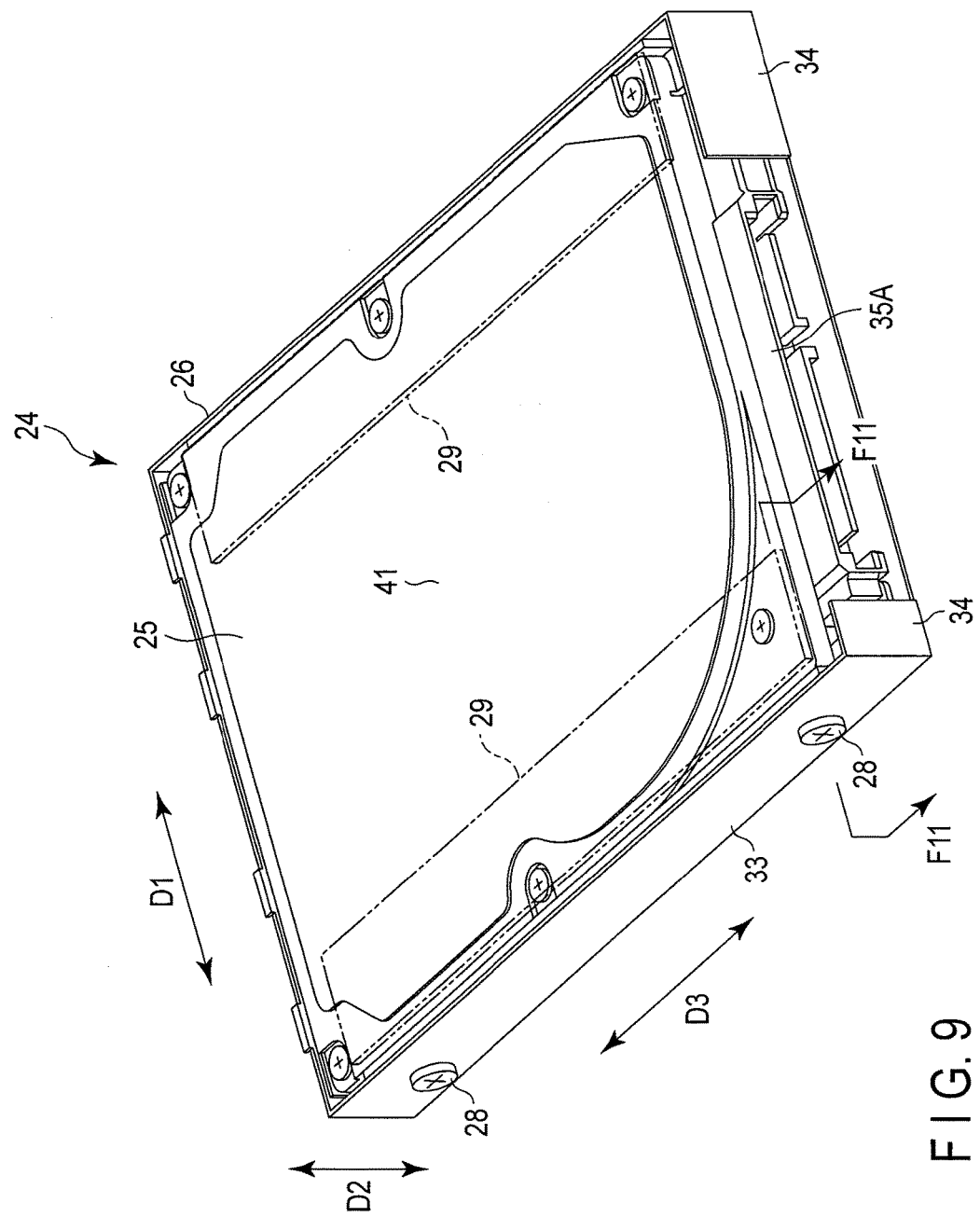
FIG. 9 is a perspective view schematically showing the module assembly in FIG. 8.

As shown in FIGS. 9 and 10, the module assembly 24 has a module 25 formed in a box shape, a first case 26 surrounding the outer side of the module 25, a first cushion 27 provided between the module 25 and the first case 26, a fastening member 28 that holds the module 25 with respect to the first case 26, and a second cushion 29 attached on the inner surface of the cover 17.

As shown in FIG. 10, the first case 26 is formed from a metallic material in a box shape having an opening on one side. The first case 26 includes a first wall portion 31 forming a bottom wall, a second wall portion 32 forming a side wall rising from the first wall portion 31 and having a attaching portion 32A to the enclosure 12, a pair of third wall portions 33 forming a side wall rising from the first wall portion 31 and through which the fastening member 28 (or a holding member) passes and a fourth wall portion 34 forming a side wall rising from the first wall portion 31 and positioned near a connector 35A. The third wall portion 33 has a hole 36 to allow the fastening member 28 to pass through. In FIG. 9, the attaching portion 32A is omitted.

In the present embodiment, as shown in FIG. 9, the module 25 is configured by a hard disk drive (HDD), but is not limited to the above example. The module 25 may be, for example, an optical disk device (ODD), a flash memory, a module mounted with a graphic chip, a wireless LAN module, or other components like a battery.

The module 25 includes a second case 37 forming an outer shell thereof. The second case 37 is a so-called shield case and prevents an electromagnetic wave from leaking from the module 25 to the outside or conversely an outside electromagnetic wave from adversely affecting the inside of the module 25.

Like the module 25 shown in FIG. 4, the second case 37 has a first face 41 positioned near the enclosure 12 (cover 17), a second face 42 opposed to the first face 41, a third face 43 having a connector 35A connected to the printed circuit board 68 via a flexible cable or the like, a fourth face 44 opposed to the third face 43, and a pair of fifth faces 45 provided with a anchor hole 47 to which the fastening member 28 (holding member) is secured.

As shown in FIG. 11, the fastening member 28 is an example of the holding member holding the module 25 movably with respect to the first case 26 and is configured by a so-called shouldered screw in the present embodiment. The fastening member 28 includes an engaging portion 51 in which a external thread is formed so as to be engaged with the module 25, an shaft 52 extending from the engaging portion 51 and inserted into the hole 36 of the first case 26, and a head portion 53 continuously formed with the shaft 52. The shaft 52 is formed in a cylindrical shape, but no external thread is formed on the outer circumferential surface thereof. The head portion 53 is an example of a blocking portion and blocks the shaft 52 from dropping from the hole 36 of the first case 26. In the present embodiment, a first gap 54 of a predetermined dimension (for example, 0.5 mm to a few mm) is formed between the head portion 53 and the first case 26.

The length of each portion of the module assembly 24 is designed so that when the fastening member 28 is screwed into the module 25, the first gap 54 remains between the first case 26 and the head portion 53 by an end face of the shaft 52 being bumped against the second case 37 of the module 25. In addition, a second gap 55 of a predetermined dimension (for example, 0.5 mm to a few mm) is formed between the shaft 52 of the fastening member 28 and the hole 36 of the first case 26.

As shown in FIG. 10, the first cushion 27 has a plurality (four in the present embodiment) of first portion 56 attached to the first case 26 so as to correspond to corners of the module 25 and a plurality (four in the present embodiment) of second portions 57 attached to the first wall portion 31 of the first case 26. Like in the first embodiment, the first portion 56 is formed like covering a corner of the module 25 and abuts on three faces of the module 25.

The second portion 57 is formed in a sheet shape and abuts on the second face 42 of the module 25. Both of the first portion 56 and the second portion 57 of the first cushion 27 are formed from an elastic body such as synthetic rubber. Instead of synthetic rubber, the first portion 56 and the second portion 57 may be formed from other materials such as a sponge.

As shown in FIGS. 8 and 9, the second cushion 29 is formed in a sheet shape having a predetermined thickness and abuts on the first face 41 of the module 25. The second cushion 29 is formed from an elastic body such as synthetic rubber. Instead of synthetic rubber, the second cushion 29 may be formed from other materials such as a sponge. The second cushion 29 may be pasted to the first face 41 of the module 25.

Subsequently, an impact absorption function for the module 25 of the portable computer 61 in the second embodiment will be described with reference to FIGS. 9 and 11. The first gap 54 is provided between the head portion 53 of the fastening member 28 and the first case 26 (FIG. 11, the third wall portion 33) and thus, even though it is an infinitesimal distance, the module 25 can move inside the first case 26 in an opposite direction of the impact along the D1 direction when an impact is applied to the portable computer 61 in the D1 direction in FIGS. 9 and 11. When the module 25 moves as described above, a difference of relative kinetic energy between the module 25 and the first case 26 is absorbed by the first portion 56 of the first cushion 27 positioned in the moving direction. Accordingly, an impact or vibration propagated to the first case 26 is prevented from being directly transmitted to the module 25.

Similarly, the second gap 55 is provided between the shaft 52 of the fastening member 28 and the hole 36 of the first case 26 and thus, even though it is an infinitesimal distance, the module 25 can move inside the first case 26 in an opposite direction of the impact along the D2 direction or the D3 direction when an impact is applied to the portable computer 61 in the D2 direction or the D3 direction in FIGS. 9 and 11. When the module 25 moves in the D2 direction, kinetic energy of the module 25 is absorbed by the first portion 56 and the second portion 57 of the first cushion 27 or the second cushion 29 positioned in the moving direction. When the module 25 moves in the D3 direction, a difference of relative kinetic energy between the module 25 and the first case 26 is absorbed by the first portion 56 of the first cushion 27 positioned in the moving direction. Accordingly, an impact or vibration propagated to the first case 26 is prevented from being directly transmitted to the module 25.

According to the second embodiment, an electronic apparatus includes the module 25, the first case 26 provided on the outer side of the module 25, the first cushion 27 provided between the module 25 and the first case 26, and a holding member (or the fastening member 28) that holds the module 25 in the first case 26 and permits movement of the module 25 inside the first case 26.

According to the above configuration, the module 25 is held by the holding member such that movement of the module 25 inside the first case 26 is permitted, that is, in a floating state. Then, the first cushion 27 is interposed between the module 25 and the first case 26 and thus, even when an impact is applied to an electronic apparatus, the impact can be prevented from being directly applied to the module 25.

The holding member (or the fastening member 28) includes an engaging portion 51 engaged with the module 25, an shaft 52 extending from the engaging portion 51 and inserted into the hole 36 of the first case 26, and a blocking portion that blocks the shaft 52 from dropping from the hole 36. According to the above configuration, the module 25 is held by the holding member inside the first case 26 so as not to drop from the first case 26.

The first gap 54 is formed between the head portion 53 (or the blocking portion) and the first case 26. Thus, the module 25 can be prevented from being secured by the holding member so as not to be able to move with respect to the first case 26.

The module 25 is formed in a box shape and the first cushion 27 is provided in a position corresponding to a corner of the module 25. The first cushion 27 abuts on at least two faces of the module 25. According to the above configuration, the first cushion 27 abuts on two faces or more of the module 25 and thus, the number of components of a portable computer can be reduced by reducing the number of the first cushions 27.

Figure 12:
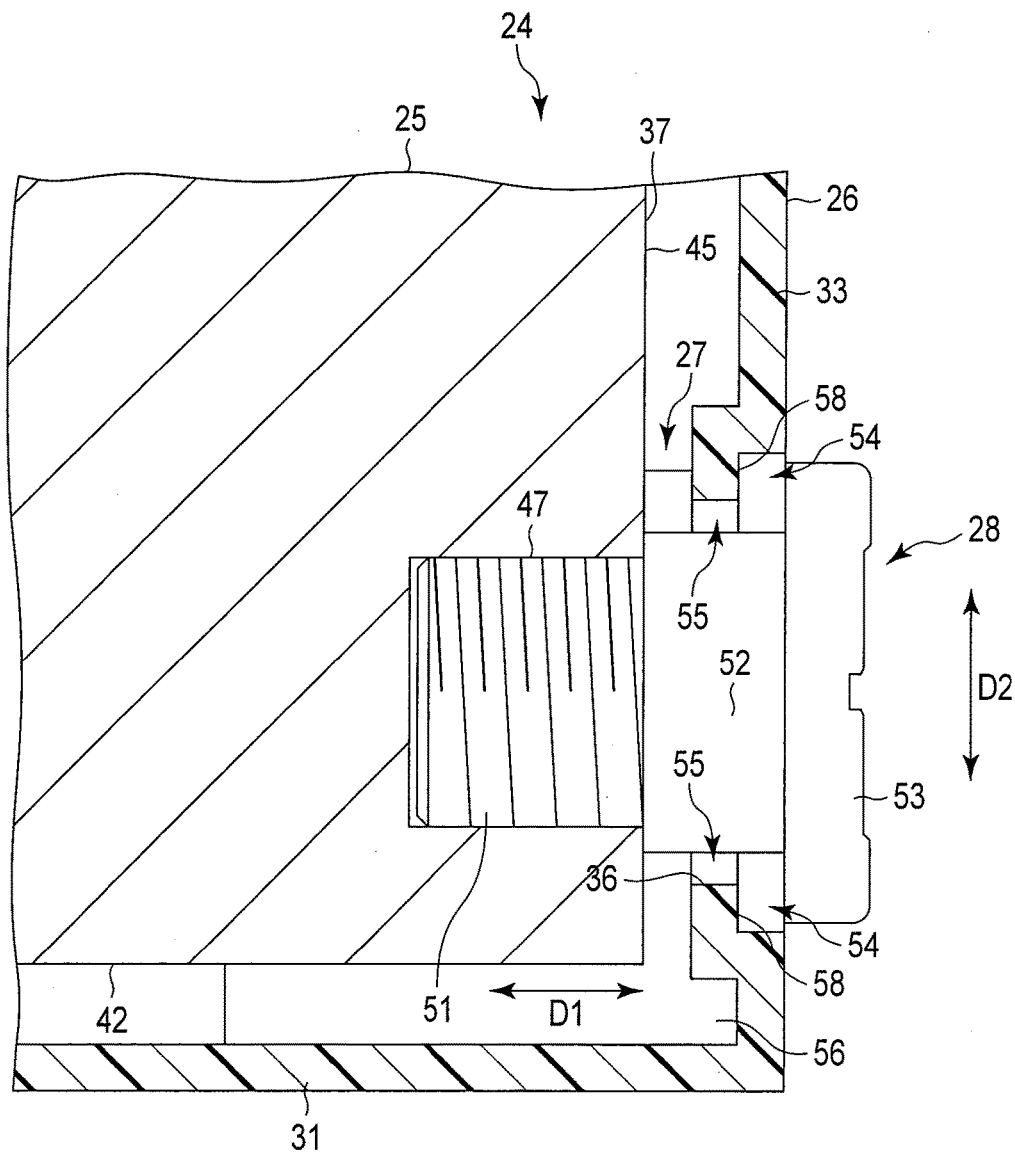
FIG. 12 shows a sectional view of a first modification of the electronic apparatus according to the second embodiment.

Subsequently, a modification (first modification) of an electronic apparatus in the second embodiment will be described with reference to FIG. 12. In the present modification, a dent portion 58 is provided on the third wall portion 33 of the first case 26 in a position corresponding to the head portion 53 (or the blocking portion) of the fastening member 28 as an example of the holding member. The diameter of the dent portion 58 is formed equally or a little larger than the diameter of the head portion 53. The first gap 54 is provided between the dent portion 58 and the head portion 53 (or the blocking portion). According to the present modification, the first gap 54 can surely be created between the head portion 53 and the first case 26 and thus, even if affected by a manufacturing tolerance contained in each component, the module 25 can be prevented from being unable to move with respect to the first case 26.

Figure 13:
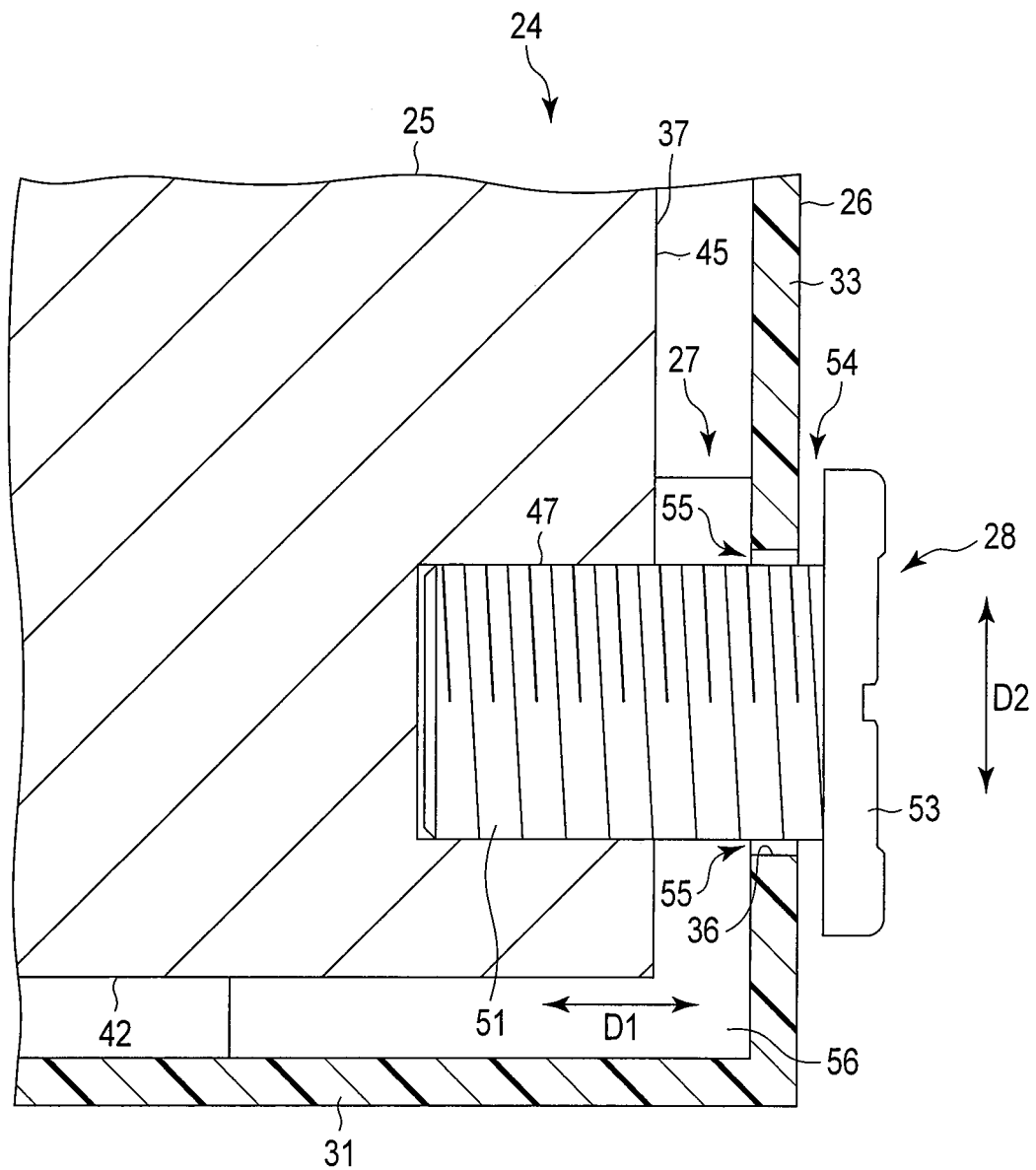
FIG. 13 shows a sectional view of a second modification of the electronic apparatus according to the second embodiment.

Subsequently, a modification (second modification) of an electronic apparatus in the second embodiment will be described with reference to FIG. 13. In the present modification, the fastening member 28 as an example of the holding member is configured not by a shouldered screw, but by a common screw (that is, a parallel screw without the shouldered portion of the shaft). The first gap 54 is provided between the head portion 53 of the fastening member 28 and the third wall portion 33 of the first case 26. The first gap 54 may be provided by a worker who assembles the module 25 while visually being checked and created. Alternatively, the length of each portion may be designed so that the first gap 54 is created between the head portion 53 and the first case 26 by providing a bottom in the anchor hole 47 of the module 25 and bumping the tip of the engaging portion 51 of the fastening member 28 against the bottom. Also in the present modification, the first gap 54 is provided between the head portion 53 of the fastening member 28 and the third wall portion 33 of the first case 26 and thus, the module 25 can be made movable with respect to the first case 26. Accordingly, even when an impact is applied to an electronic apparatus, the impact can be prevented from being directly applied to the module 25.

Subsequently, a modification (third modification) of an electronic apparatus in the second embodiment will be described with reference to FIG. 14. In the present modification, instead of the fastening member 28 in the second embodiment, a protrusion portion 71 formed integrally with the first case 26 is provided. The protrusion portion 71 is an example of the holding member that holds the module 25 movably with respect to the first case 26. The protrusion portion 71 protrudes from the first case 26 to the side of the module 25 and exhibits flexibility as a whole. The protrusion portion 71 has an abutting portion 71A abutting on the module 25 near a tip portion thereof. The abutting portion 71A protrudes from the first case 26 toward the module 25.

The protrusion portion 71 holds the module 25 inside the first case 26 such that the module 25 is permitted to move in the range of an infinitesimal distance inside the first case 26. According to these modifications, like the second embodiment, an impact from outside can be prevented from being directly applied to the module 25.

Third Embodiment

Subsequently, the third embodiment of an electronic apparatus will be described with reference to FIGS. 15 and 16. The present embodiment will be described by taking as an example a portable computer 61 as an example of the electronic apparatus. The portable computer 61 is different from the portable computer in the second embodiment in that a portion 27A of a first cushion 27 is attached to the side of the module 25 and otherwise, the present embodiment is common to the second embodiment. Thus, mainly different portions will be described and the description of common portion is omitted. The portable computer 61 in the third embodiment has an outer shape similar to that shown in FIG. 7.

A module assembly 24 has the module 25 in a box shape, a first case 26 surrounding the outer side of the module 25, a first cushion 27 provided between the module 25 and the first case 26, a fastening member 28 that holds the module 25 with respect to the first case 26, and a second cushion 29 attached on the inner surface of a cover 17.

In the present embodiment, the module 25 is configured by a hard disk drive (HDD), but, for example, like the other embodiments described above, other components mat also be adopted.

The module 25 includes a second case 37 as an outer shell thereof. The second case 37 is a so-called shield case that blocks electromagnetic waves.

Like the module 25 shown in FIG. 4, the second case 37 has a first face 41 positioned near a enclosure 12 (or the cover 17), a second face 42 opposing the first face 41, a third face 43 having a connector 35A, a fourth face 44 opposing the third face 43, and a pair of fifth faces 45 provided with a anchor hole 47 to which the fastening member 28 (or a holding member) is attached. The second case 37 is provided with openings 75 at four corners adjacent to the second face 42. The connector 35A is connected to a printed circuit board 68 via an opposing connector 35B, a connector substrate 72, and a flexible cable (not shown) or the like.

The fastening member 28 is an example of the holding member and is configured by a shouldered screw in the present embodiment, which is the same as in the second embodiment. In the present embodiment, a first gap 54 of a predetermined dimension (for example, 0.5 mm to a few mm) is formed between the head portion 53 of the fastening member 28 and the first case 26. The length of each portion of the module assembly 24 is designed so that when the fastening member 28 is advanced toward the module 25, the first gap 54 remains between the first case 26 and the head portion 53 by an end face of the shaft 52 being bumped against the second case 37 of the module 25. In addition, a second gap 55 of a predetermined dimension (for example, 0.5 mm to a few mm) is formed between the shaft 52 of the fastening member 28 and a hole 36 of the first case 26.

The first cushion 27 has a plurality (four in the present embodiment) of the portions 27A provided in positions corresponding to corners of the module 25. Each of the portions 27A has a base portion 73 provided on the inner side of the second case 37 of the module 25 and a projecting part 74 protruding to the outer side of the second case 37 via the opening 75. The projecting part 74 can abut on two wall portions or more of the first case 26. For example, the portion 27A shown in the lower left in FIG. 15 abuts on, as shown in FIGS. 15 and 16, a first wall portion 31, a third wall portion 33, and a fourth wall portion 34 of the first case 26. Similarly, the portion 27A shown in the lower right in FIG. 15 abuts on, as shown in FIGS. 15 and 16, the first wall portion 31 and the third wall portion 33 of the first case 26. Each of the portions 27A of the first cushion 27 is formed from an elastic body such as synthetic rubber. Instead of synthetic rubber, the portion 27A may be formed from a member of other materials such as a sponge.

Each of the portions 27A of the first cushion 27 is formed from an elastic body such as synthetic rubber, but may also be formed from other materials such as a sponge.

Subsequently, an impact absorption function for the module 25 of the portable computer 61 in the third embodiment will be described with reference to FIGS. 15 and 16. The first gap 54 is provided between the head portion 53 of the fastening member 28 and the first case 26 (in this case, the third wall portion 33) and thus, even though it is an infinitesimal distance, the module 25 can move inside the first case 26 in an opposite direction of the impact along the D1 direction when an impact is applied to the portable computer 61 in the D1 direction in FIG. 15. When the module 25 moves as described above, a difference of relative kinetic energy between the module 25 and the first case 26 is absorbed by a first portion 56 of the first cushion 27 positioned in the moving direction.

Figure 15:
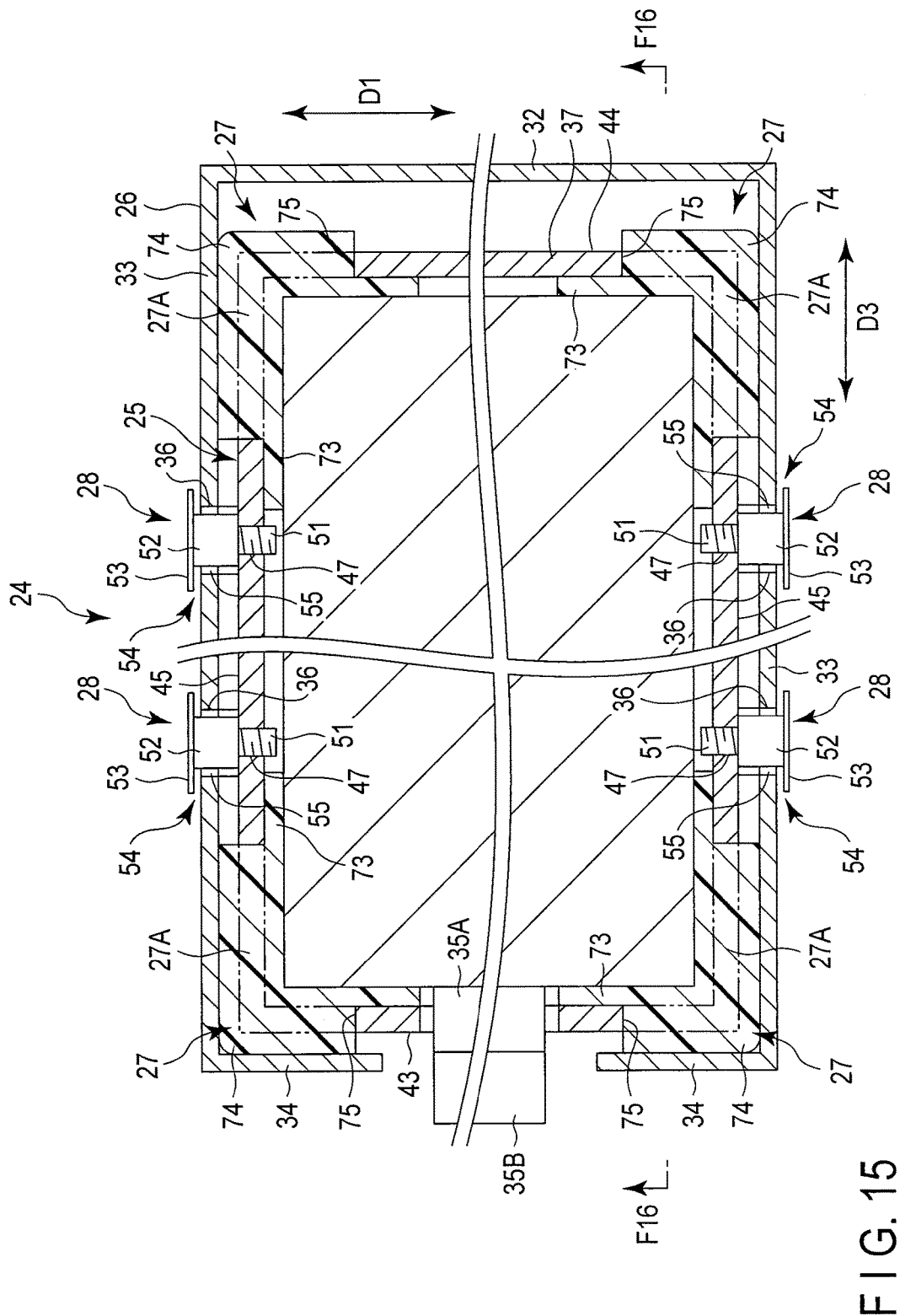
FIG. 15 is a sectional view of the module assembly of the portable computer as an example of the electronic apparatus according to the third embodiment cut along a D1 direction and a D3 direction.

Similarly, the second gap 55 is provided between the shaft 52 of the fastening member 28 and the hole 36 of the first case 26 and thus, even though it is an infinitesimal distance, the module 25 can move inside the first case 26 in an opposite direction of the impact along the D2 direction or the D3 direction when an impact is applied to the portable computer 61 in the D2 direction or the D3 direction in FIGS. 15 and 16. When the module 25 moves in the D2 direction, a difference of relative kinetic energy between the module 25 and the first case 26 is absorbed by the portion 27A of the first cushion 27 or the second cushion 29 positioned in the moving direction. When the module 25 moves in the D3 direction, a difference of relative kinetic energy between the module 25 and the first case 26 is absorbed by the first cushion 27 positioned in the moving direction.

According to the third embodiment, the module 25 forms a box shape and the first cushion 27 protrudes from the module 25 in a position of a corner of the module 25. The module 25 abuts on at least two wall portions of the first case 26. According to the above configuration, the first cushion 27 abuts on two wall portions or more of the first case 26 and thus, the number of components of a portable computer can be reduced by reducing the number of the first cushions 27.

An electronic apparatus includes the enclosure 12 internally accommodating the first case 26, the cover 17 removable from the enclosure 12, and the second cushion 29 provided on the inner surface of the cover 17 and abutting on the first case 26. According to the above configuration, an impact can be prevented from being applied to the module 25 while a structure in which the module 25 is easily accessible from outside the enclosure 12 being realized.

Fourth Embodiment

Subsequently, the fourth embodiment of an electronic apparatus will be described with reference to FIGS. 17 and 18. In the present embodiment, a case when applied to a portable computer 61 as an example of the electronic apparatus will be described. The portable computer 61 is different from that in the second embodiment in that a first case 26 surrounds all six faces of a module 25, a first cushion 27 is arranged differently, and no cover 17 is provided and otherwise, the present embodiment is common to the second embodiment. Thus, mainly different portions will be described and the description of common portions is omitted. The portable computer 61 in the fourth embodiment has an outer shape similar to that shown in FIG. 7.

A module assembly 24 has the module 25 forming a box shape, a first case 26 surrounding the outer side of the module 25, a first cushion 27 provided between the module 25 and the first case 26, and a fastening member 28 that holds the module 25 with respect to the first case 26.

The first case 26 is formed from a metallic material in a box shape surrounding six faces of the module 25. The first case 26 includes a first wall portion 31 forming a bottom wall and opposed to a second face 42 of the module 25, a second wall portion 32 forming a side wall rising from the first wall portion 31, a pair of third wall portions 33 forming a side wall rising from the first wall portion 31 and through which the fastening member 28 (or a holding member) passes, a fourth wall portion 34 forming a side wall rising from the first wall portion 31 and positioned near a connector 35A, and a fifth wall portion 38 facing the first wall portion 31. The third wall portion 33 has a hole 36 to allow the fastening member 28 to pass through. Each wall portion of the first case 26 is opposed one-to-one to each face of the module 25.

In the present embodiment, the module 25 is configured by a hard disk drive (HDD), but is not limited to such an example and other components may also be adopted like the above embodiments. A detailed configuration of the module 25 is the same as that of the second embodiment. The connector 35A is connected to a printed circuit board 68 via an opposed connector 35B, a connector substrate 72, and a flexible cable (not shown) or the like.

The configuration of the fastening member 28 is the same as that of the second embodiment. In the present embodiment, a first gap 54 of a predetermined dimension (for example, 0.5 mm to a few mm) is formed between a head portion 53 and the first case 26. In addition, a second gap 55 of a predetermined dimension (for example, 0.5 mm to a few mm) is formed between an shaft 52 of the fastening member 28 and the hole 36 of the first case 26. In the present embodiment, the fastening member 28 may be omitted.

The first cushion 27 has a plurality (eight in the present embodiment) of first portions 56 attached to the first case 26 so as to correspond to eight corners of the module 25. The first portion 56 has approximately the same shape as that of the first portion 56 in the second embodiment and a little smaller dimension. As shown in FIGS. 17 and 18, the first portion 56 is formed like covering a corner of the module 25 and abuts on three faces of the module 25. The first portion 56 is provided in each gap formed between a face of the module 25 and a wall portion of the first case 26. Each of the first portions 56 of the first cushion 27 are formed from an elastic body such as synthetic rubber. Instead of synthetic rubber, the first portion 56 may be formed from other materials such as a sponge.

Subsequently, an impact absorption function for the module 25 of the portable computer 61 in the fourth embodiment will be described with reference to FIGS. 17 and 18. The first gap 54 is provided between the head portion 53 of the fastening member 28 and the first case 26 (here, the third wall portion 33) and thus, even though it is an infinitesimal distance, the module 25 can move inside the first case 26 in an opposite direction of the impact along the D1 direction when an impact is applied to the portable computer 61 in the D1 direction in FIG. 17. When the module 25 moves as described above, a difference of relative kinetic energy between the module 25 and the first case 26 is absorbed by the first portion 56 of the first cushion 27 positioned in the moving direction.

Figure 17:
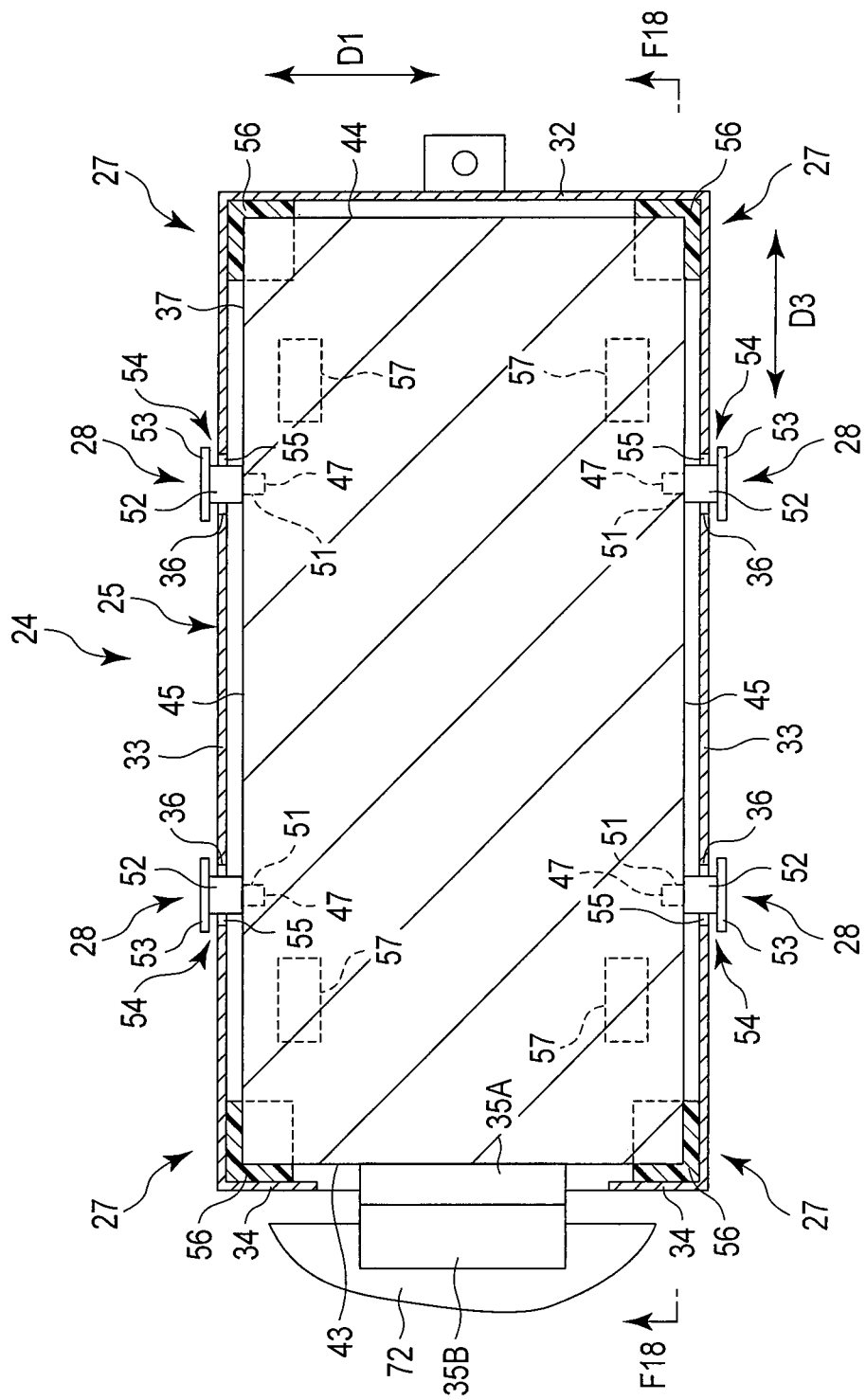
FIG. 17 is a sectional view of the module assembly of the portable computer as an example of the electronic apparatus according to a fourth embodiment cut along the D1 direction and the D3 direction.
Figure 18:
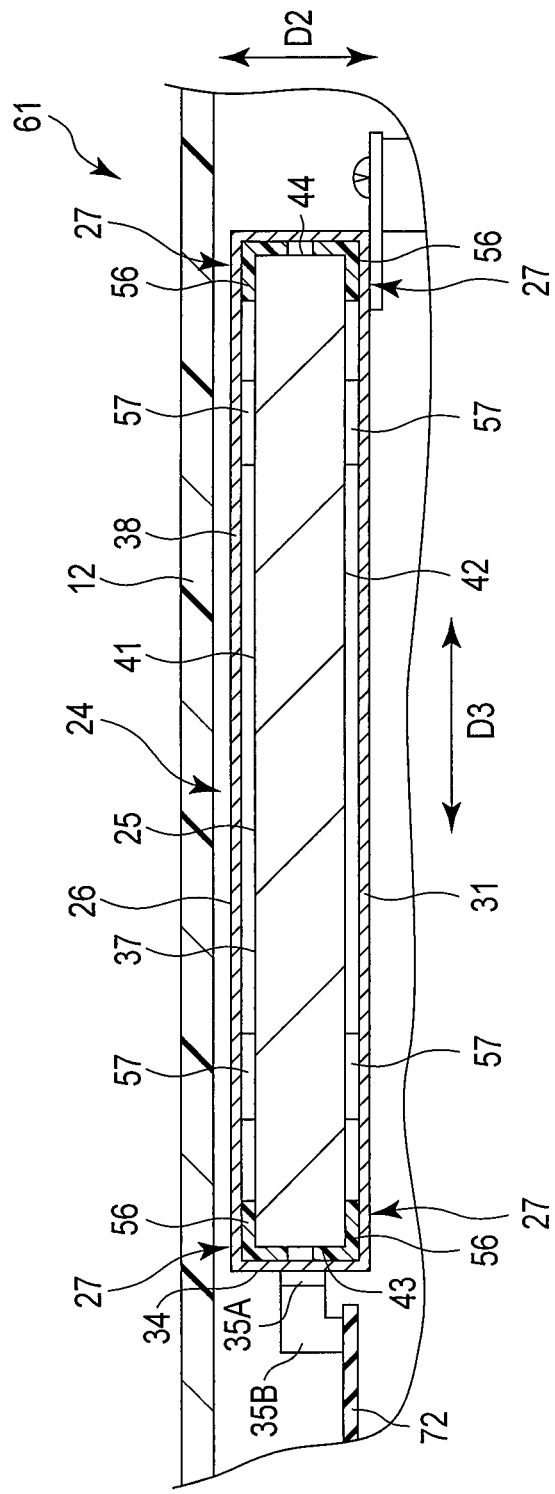
FIG. 18 is a sectional view of the module assembly in FIG. 17 cut along the D2 direction and the D3 direction.

Like in the D1 direction, the second gap 55 is provided between the shaft 52 of the fastening member 28 and the hole 36 of the first case 26 and thus, even though it is an infinitesimal distance, the module 25 can move inside the first case 26 in an opposite direction of the impact along the D2 direction or the D3 direction when an impact is applied to the portable computer 61 in the D2 direction or the D3 direction in FIGS. 17 and 18. When the module 25 moves in the D2 direction, a difference of relative kinetic energy between the module 25 and the first case 26 is absorbed by the first cushion 27 positioned in the moving direction. When the module 25 moves in the D3 direction, a difference of relative kinetic energy between the module 25 and the first case 26 is absorbed by the first cushion 27 positioned in the moving direction.

According to the fourth embodiment, the module 25 has a box shape having a plurality of faces and the first case 26 has a plurality of wall portions opposed to a plurality of faces one-to-one. Then, the first cushion 27 has a plurality of the portions 27A provided in each gap created between a face and a wall portion opposed to each other. According to the above configuration, in whichever direction the module 25 vibrates, a difference of relative kinetic energy between the module 25 and the first case 26 is absorbed by the first cushion 27. Therefore, a strong impact can be prevented from being applied to the module 25.

The plurality of the portions 27A is provided in positions corresponding to corners of the module 25 and abuts on at least two faces of the module 25. According to the above configuration, each portion of the first cushion 27 abuts on two faces or more of the module 25 and thus, the number of components can be reduced by reducing the number of the first cushions 27.

In each of the above embodiments, the connector 35A of the module 25 is connected to the system board 21 (or the printed circuit board 68) via a flexible cable or the like. The connector 35A may directly be connected to the remote connector 35B implemented in the system board 21 (or the printed circuit board 68).

The electronic apparatus is not limited to the television 11 or the portable computer 61 described in details in the above embodiments. The above technologies and configurations of the electronic apparatuses can naturally be applied to other electronic apparatuses like, for example, a mobile phone and an electronic book reader.

The electronic apparatuses are not limited to as they are in the above embodiments and can be embodied by modifying elements without deviating from the spirit thereof in a working stage. Further, a plurality of elements disclosed in the above embodiments may appropriately be combined to form various inventions. For example, some elements may be excluded from all elements shown in one embodiment. Further, elements of a plurality of embodiments may appropriately be combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus including a main body, a display, and a hinge which can rotatably support the display to the main body, the main body of the electronic apparatus comprising: a module accommodated in a first case and having anchor holes at both ends of a pair of side surfaces; the first case surrounding an outside of the module, the first case including a bottom surface and four side walls; a first cushion between each of four corners of the first case and each of four corners of the module, the first cushion being in contact with the bottom surface at each corner of the module and with two adjacent side walls of the four side walls; and a holding member configured to hold the module movably with respect to the first case, the holding member including a shouldered screw and holding the module movably with respect to the first case in each of four positions of the first case; a compartment accommodating the first case containing the module inside; a cover detachably located with respect to the compartment; and a second cushion provided inside the cover and being in contact with a first surface of the first case, wherein the shouldered screw of the holding member includes an engaging portion which is engaged with the anchor hole of the module, a shaft which extends from the engaging portion and is inserted into a hole formed in the first case in a position correspond to the anchor hole, and a head portion which blocks the shaft from dropping from the hole, a first gap is formed between the head portion and the first case, and a second gap is formed between the shaft and the hole of the first case, wherein the first case comprises a dent portion depressed inwardly and the dent portion and the head portion are arranged with the first gap there between.

2. An electronic apparatus comprising: a module including anchor holes at both ends of a pair of side surfaces; a first case surrounding an outside of the module and having a bottom surface and four side walls; a first cushion between each of four corners of the first case and each of four corners of the module, the first cushion being in contact with the bottom surface at each corner of the module and with two adjacent side walls; and a holding member configured to hold the module with respect to the first case movably in the first case, the holding member including a shouldered screw and holding the module movably with respect to the first case in each of four positions of the first case; a compartment accommodating the first case containing the module inside; a cover detachably located with respect to the compartment; and a second cushion provided inside the cover and being in contact with a first surface of the first case, wherein the shouldered screw of the holding member includes an engaging portion which is engaged with the anchor hole of the module, a shaft which extends from the engaging portion and is inserted into a hole formed in the first case in a position correspond to the anchor hole, and a head portion which blocks the shaft from dropping from the hole, a first gap is formed between the head portion and the first case, a second gap is formed between the shaft and the hole of the first case, and the first case comprises a dent portion depressed inwardly and the dent portion and the head portion are arranged with the first gap there between.

* * * * *